Nov. 17, 1953     B. F. KENYON     2,659,248
TRANSMISSION
Filed Nov. 16, 1951     6 Sheets-Sheet 1

Inventor
Bertrand F. Kenyon
By
Frank E. Liverance, Jr.
Attorney

Nov. 17, 1953

B. F. KENYON 2,659,248

TRANSMISSION

Filed Nov. 16, 1951

Inventor
Bertrand F. Kenyon
By Frank E. Liverance, Jr.
Attorney

Nov. 17, 1953

B. F. KENYON 2,659,248

TRANSMISSION

Filed Nov. 16, 1951

Inventor
Bertrand F. Kenyon

By

Attorney

Nov. 17, 1953

B. F. KENYON 2,659,248

TRANSMISSION

Filed Nov. 16, 1951

Inventor
Bertrand F. Kenyon
By
Frank E. Liverance Jr.
Attorney

Nov. 17, 1953

B. F. KENYON 2,659,248

TRANSMISSION

Filed Nov. 16, 1951

Inventor
Bertrand F. Kenyon
By
Frank E. Liverance, Jr.
Attorney

Fig. 12.

Patented Nov. 17, 1953

2,659,248

UNITED STATES PATENT OFFICE 2,659,248

TRANSMISSION

Bertrand F. Kenyon, Grand Rapids, Mich., assignor to Mechano Gear Shift Company, Grand Rapids, Mich., a corporation of Michigan Application November 16, 1951, Serial No. 256,715

14 Claims. (Cl. 74—751)

This invention relates to a power drive transmission interposed between a driving shaft and a shaft to be driven thereby, with novel mechanism for transmitting from the drive shaft to the driven shaft at an infinite or indefinite number of speeds or ratio of speeds between them. In the operation of the power transmission, the drive and the driven shaft may be in a direct one to one ratio, but an indefinite number of variations in the driving ratio are obtainable from a point at which the operation of the drive shaft will not rotate or move the driven shaft, which will remain motionless, and therefrom through all of the variations of ratio until direct drive between the drive and driven shafts is obtained.

With my invention torque delivery is accomplished which is smooth and controlled and may be varied at all times without loss of motion in the direct drive, one to one, ratio and which direct drive is attained whenever the power supplied equals the load. In my invention a novel mechanism is provided for utilizing centrifugal force in connection with a bending moment torque arm to drive the driven shaft, which centrifugal force is preferred; or, equivalently, spring force may be used either substantially alone or in addition to or as a complement of centrifugal force, which spring force, in direct drive, when the centrifugal force developed becomes greater than the spring force, supplies the main useful mechanism in connection with the drive transmission, such spring force being desirable and in fact practically necessary when a reverse driving is to be obtained, that is, the driven shaft shall drive the drive shaft and the drive shaft has a load to be overcome, one example of which is the crankshaft of an internal combustion engine in a motor vehicle, which ordinarily is the drive shaft which, in order to be turned, must overcome the resisting compression of the engine.

Many novel structures, arrangement of parts and combinations for attaining the desired functions and ends of the invention will be understood from the following description, taken in connection with the accompanying drawings, showing preferred and other forms of embodiment of the invention. In the drawings.

Like reference characters refer to like parts in the different figures of the drawings.

Figures 6, 7, 8:
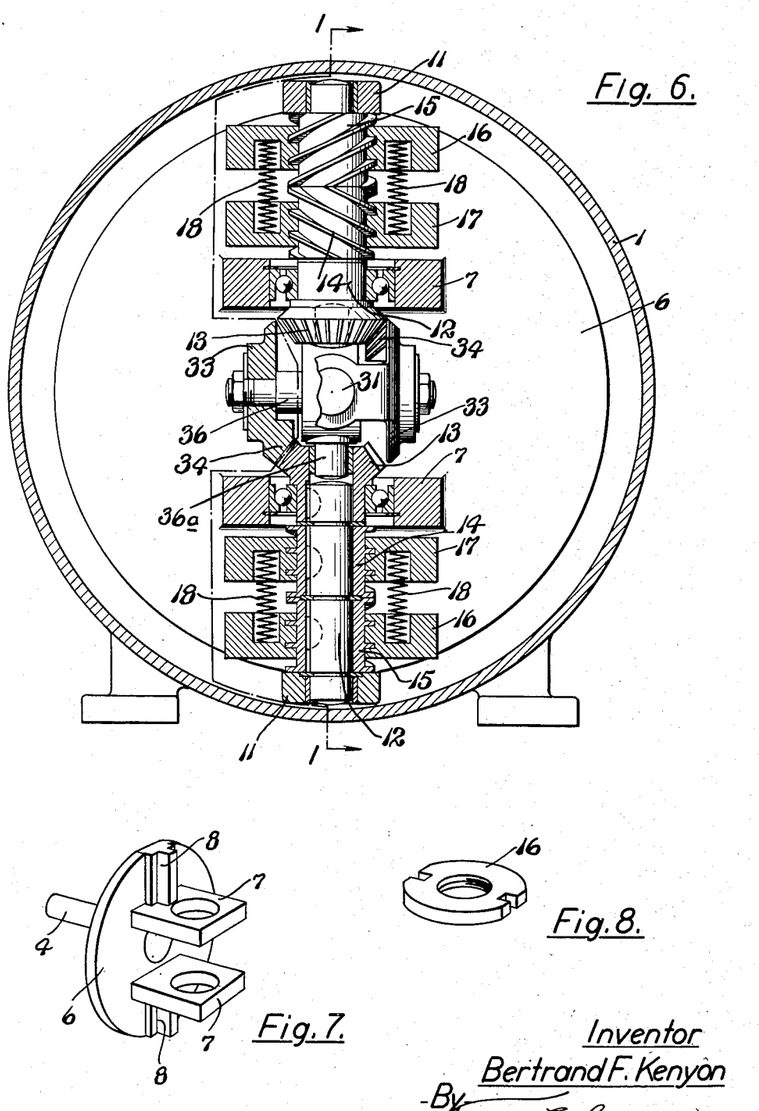
Fig. 6 is a transverse vertical section substantially on the plane of line 6—6 of Fig. 4.
Fig. 7 is a perspective view of details of structure for mounting the centrifugally actuating weights and the vertical shafts which operate them.
Fig. 8 is a perspective view of one of the centrifugal weights.

In the structure shown in Figs. 1 to 9 inclusive, a generally cylindrical housing is provided including an outer cylindrical wall 1, one end closure 2 and a second end closure 3, a drive shaft 4 passing through the closure 2 and having a mounting in a suitable anti-friction ball bearing 5 as shown. The housing, as shown in Fig. 6, may be mounted by means of legs integral with the wall 1 which rest at their lower ends on a suitable support to which they may be connected.

Figure 4:
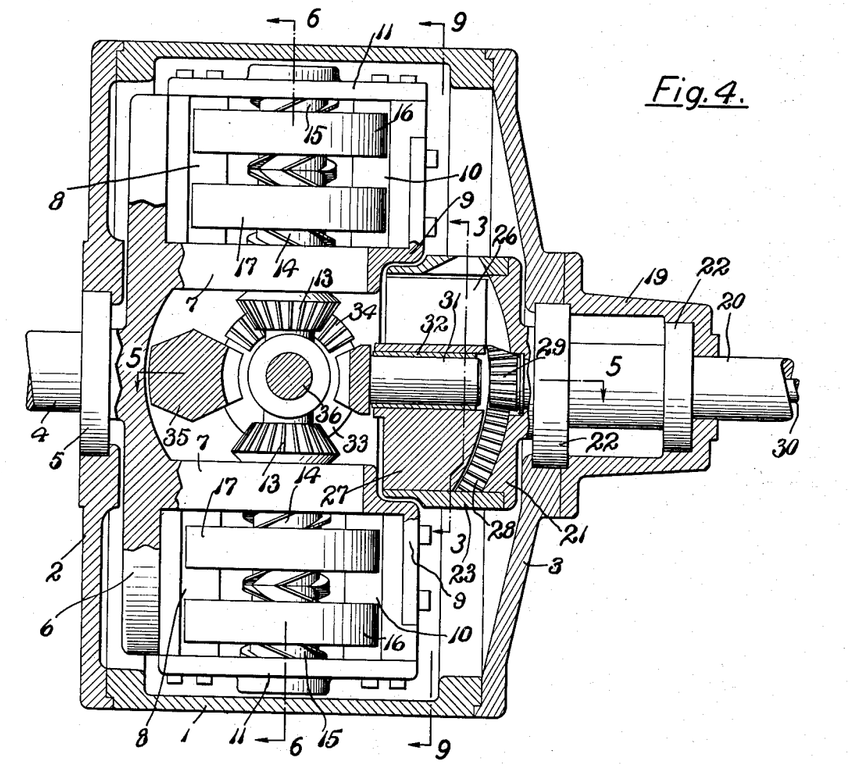
Fig. 4 is a longitudinal vertical section, similar to Fig. 1, showing the parts in a different position and in which the driven shaft is idle and is not in driving connection with the drive shaft.
Figure 5:
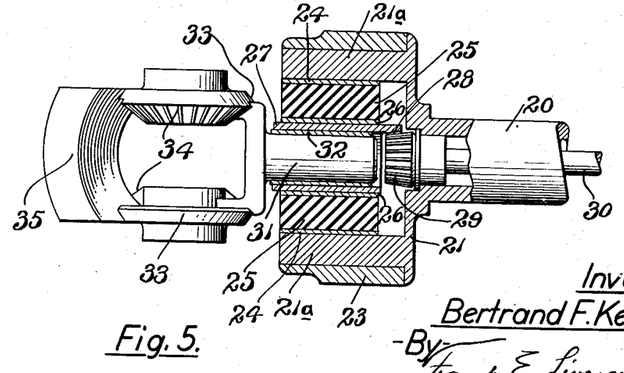
Fig. 5 is a horizontal section substantially on the plane of line 5—5 of Fig. 4.

Within the housing as described a rotor is connected to the inner end of a drive shaft 4. This rotor includes a circular plate 6 having a diameter somewhat less than the interior diameter of the housing wall 1, from which, at opposite sides of the axis of the shaft 4, spaced parallel relatively heavy plates 7 extend (Fig. 7) and at the inner side of each of the plates 7 diametrically located guide ribs 8 are provided, said plates 7 and ribs 8 being preferably integral with the disc 6. At the outer end of the plates 7 a ring 9 is secured, located in a vertical plane, and extends outwardly, to which cooperating guide ribs 10 are bolted or otherwise permanently secured, it being evident (Fig. 4) that two pairs of guides 8 and 10 are used in diametric opposition to each other. Connecting plates 11 extend between the outer ends of the guide rib members 8 and 10 and are permanently secured thereto, as best shown in Fig. 4. Radially disposed, aligned shafts 12, at their outer ends are rotatably mounted in bearings substantially midway between the ends of said plates or bars 11. Shafts 12 extend toward each other and each at its inner end has keyed thereto a beveled gear 13. There is also keyed to each of the shaft 12 two worms 14 and 15, the latter having outer ends against associated bars 11, the former their inner ends against the gears 13. The worm threads on worms 14 and 15 are opposed as best shown in Fig. 6.

On each of the worms 14 and 15 disc weights 16 and 17 are mounted, the first on the outer worms 15 and the latter on the inner worms 14. Between each pair of weights 16 and 17 a plurality of compression springs 18 may be placed. Such springs are not essential to the operation of the mechanism except where the drive shaft 4 is to be driven by the later described driven shaft, and such shaft 4 is subject to a load which must be overcome for the shaft 4 to be driven.

The pitch of the worm and of the carrier threads of the weights 16 and 17 is such that such weights will not move lengthwise of the worm except through the application of the turning force to the worm, the threads of the worm and of the weights mounted thereon being of the self-locking type. The weights, at diametrically opposed sides, are slotted for the entrance of the guide ribs 8 and 10 into the slots thereof.

The rear end closure plate 3 of the housing has an auxiliary housing 19 secured thereto (Fig. 4). The driven shaft 20 passes through the rear end of the auxiliary housing 19 and into the main housing having anti-friction bearings 22 similar to the bearing 5 located as shown in Fig. 4. Such shaft within the main housing is supplied with a head 21 having a circular rear end from which two spaced forwardly extending arms 21a extend, having curved outer surfaces being surrounded by a band or ring 23.

At the inner side of each of the arms 21a a plate 24 is permanently secured to which a rubber block 25 is secured by vulcanization or other equivalent means; and at the inner side of the block 25 a second plate 26 is similarly secured, the two plates 26 at their inner sides being spaced a distance from each other for the reception of block 27, which is a substantially solid block of metal in thickness equal substantially to the distance between the plates 26 which serve as guides at the sides of the block 27 and hold it from lateral movement.

The block 27 at its rear end portion at one side has a projecting vane at the inner side of which a consecutive series of gear teeth 28 are provided. The gear teeth 28 in effect provide an arcuate rack with which a beveled pinion 29 is in meshing engagement. The pinion 29 is at the inner end of a shaft 30 which extends axially of and lengthwise of the driven shaft 20, and which is designed to be turned manually or in any other suitable manner to turn the pinion 29 and thereupon change the position of the block 27.

Figures 1, 2, 3:
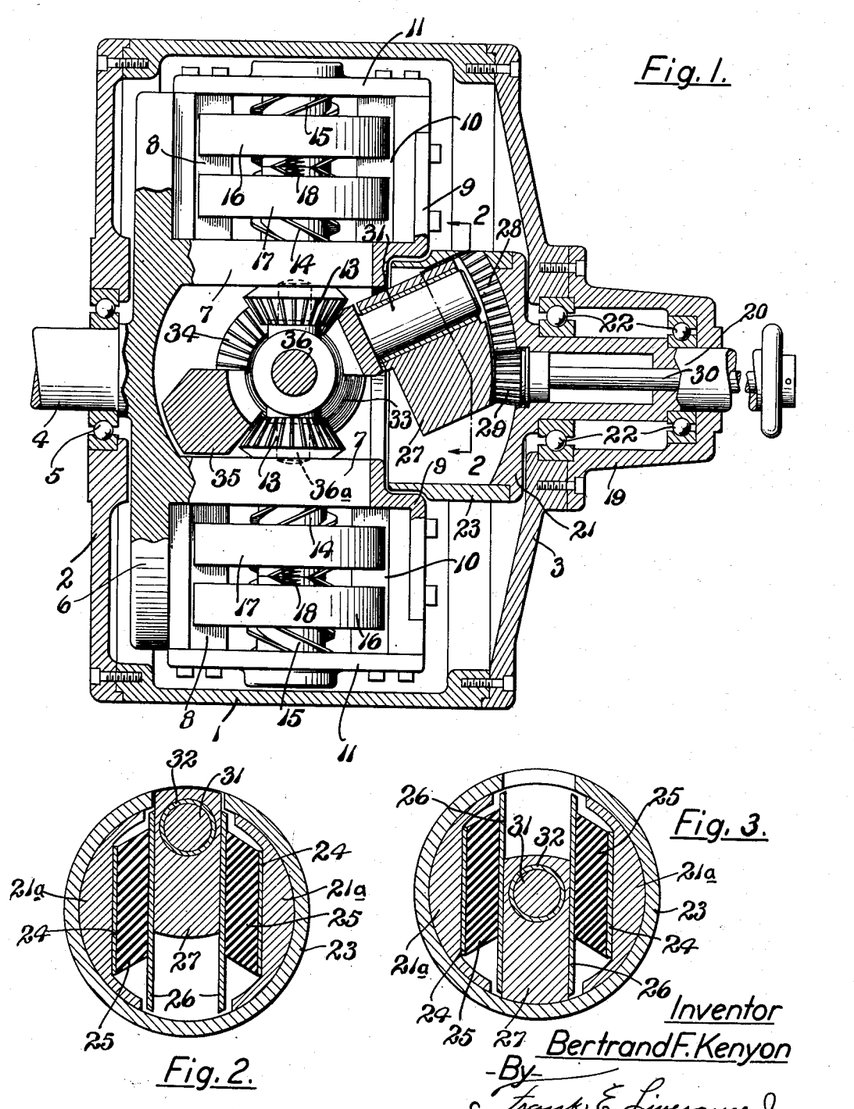
Fig. 1 is a longitudinal central vertical section through the preferred form of transmission of my invention.
Fig. 2 is a transverse vertical section on the plane of line 2—2 of Fig. 1, looking in the direction indicated.
Fig. 3 is a transverse vertical section similar to Fig. 2 on plane of line 3—3 of Fig. 4.

Block 27 above at its upper side, as shown in Figs. 1 and 4, has a bearing through which a short shaft or torque arm 31 extends and in which it is rotatably mounted, the bearing being shown at 32 (Fig. 4). The arm 31 at its inner end is integral with spaced sides 33 of a yoke and at the inner sides of the sides 33 of the yoke, segmental beveled gear teeth 34 are provided adapted to have meshing engagement with the pinions 13.

Figure 9:
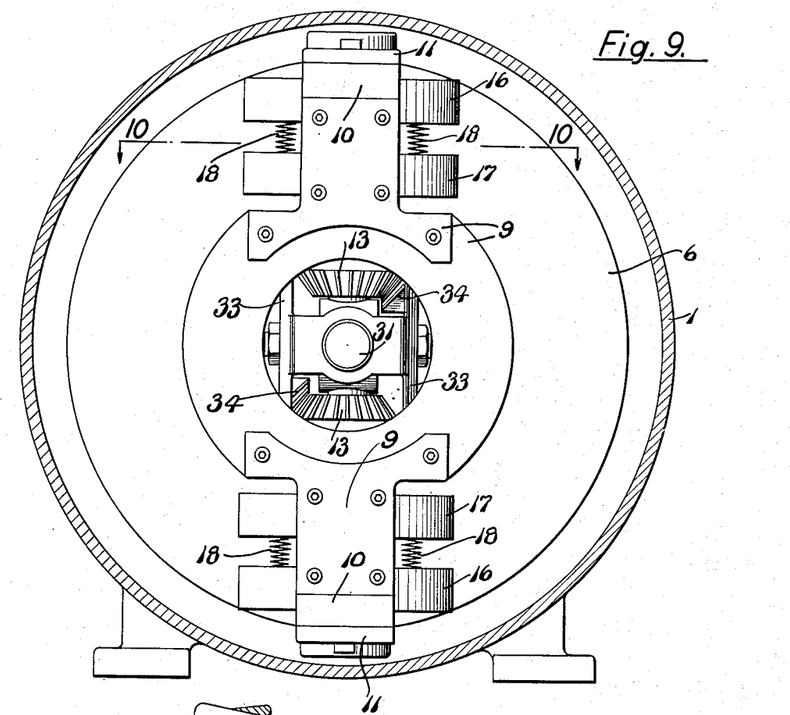
Fig. 9 is a transverse vertical section substantially on the plane of line 9—9 of Fig. 4, looking in the direction indicated.
Figure 10:
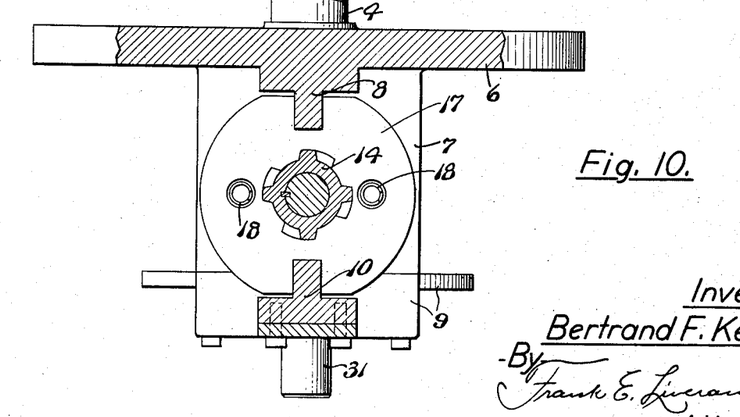
Fig. 10 is a fragmentary horizontal section and plan view substantially on the plane of lines 10—10 of Fig. 9, looking downwardly.

One pinion engages with the segmental gear 34 at one side of the yoke and the other at the opposite sides thereof (Fig. 9). The ends of the yoke sides are integrally connected by a cross member 35 which serves as a balancing weight (Figs. 1 and 4). A universal joint block is located between the spaced sides 33 of the described yoke and has two opposed short stud shafts 36 rotatably mounted on the yoke sides 33, and two other short studs 36a (Fig. 1) rotatably mounted in the beveled pinions 13 or inner ends of shafts 12 (Fig. 6). With the driving shaft 4 and the arm 31 in alignment, as in Fig. 4, upon the driving shaft 4 being rotated the mechanism turns about the axis of shaft 4, shaft 20 and its head 21 remain at rest. This is the idle position of the mechanism and no driving of the driven shaft or oscillation of weights 16 and 17 takes place.

With the arm 31 moved to either the position shown in Fig. 1 or to any of the other indefinite number of positions between that shown in Fig. 1 and that shown in Fig. 4, when the torque imparted is sufficient to turn the shaft 20 and the load to which it is subjected, the entire mechanism turns about the common axis of the shafts 4 and 20 being a direct drive relation and a ratio of speed between the two shafts being one to one. When the load on the shaft 20 is too great for the power supplied by the drive shaft 4 to drive in a one to one relation of the shafts, and inasmuch as the pinions 13 are bodily rotating about the longitudinal axis of the shaft 4, and the arm 31 and block 27 also bodily turn about the axis of such shaft 4, the oscillation of the arm 31 about the center of the universal joint block causes an alternate engagement of the pinions 13 with said gears 34, alternately rotating the shafts 12 in succession simultaneously first in one direction and then in the other, moving the weights 16 and 17 away from and then toward each other, by reason of the rotation of the shafts 12 alternately in opposite directions imparted thereto by the pinions 13. The weights 17 are heavier than the weights 16 so as to provide for said weights approximately the same centrifugal force, the radial distances of the weights outwardly from the center of the universal joint block being different, and the weights of the parts 16 and 17 correspondingly differing.

Such alternate in and out movements of the weights 16 and 17, is resisted by said weights, setting up a force which is imparted to the arm 31, thence to the block 27, and there is produced a rotation of shaft 20 in proportion to such resisting force. Therefore centrifugal force application to the shaft 20 tends to rotate it and such rotation will be less with respect to the rotative speed of the drive shaft 4 at the beginning of rotation when inertia, friction and the like have to be overcome.

With the operation described, with the springs indicated at 18 not used, no stalling of the drive shaft 4 will take place. If the load on the shaft 20 is too great, the rotation of drive shaft 4 will continue but with the shaft 20 at rest, and with centrifugal weights 16 and 17 alternately moving toward and away from each other.

The springs 18 are used when the shaft 4 subjected to a load is to be driven by the shaft 20. Without said springs merely a reciprocating movement of the weights 16 and 17 will occur, and a resistance must be supplied to such movement by the springs 18, at least equal to or greater than the load upon the shaft 4.

It is of course to be understood that from the driven shaft 20 various attachments and accessories may be used for driving many types and kinds of machines. Through a planetary or sliding gear transmission the speed of the shaft 20 may be imparted to other shafts and driven thereby at the various speeds both in a forward and a reverse direction which the planetary or sliding gear transmissions are designed to transmit. Also a pulley attached to the driven shaft 20, or a gear attached thereto, may transmit through a belt or meshing gear, the rotative movement of the shaft 20 to other mechanisms, converting either to a rotary or reciprocating or other movements, as is well understood.

Figure 11:
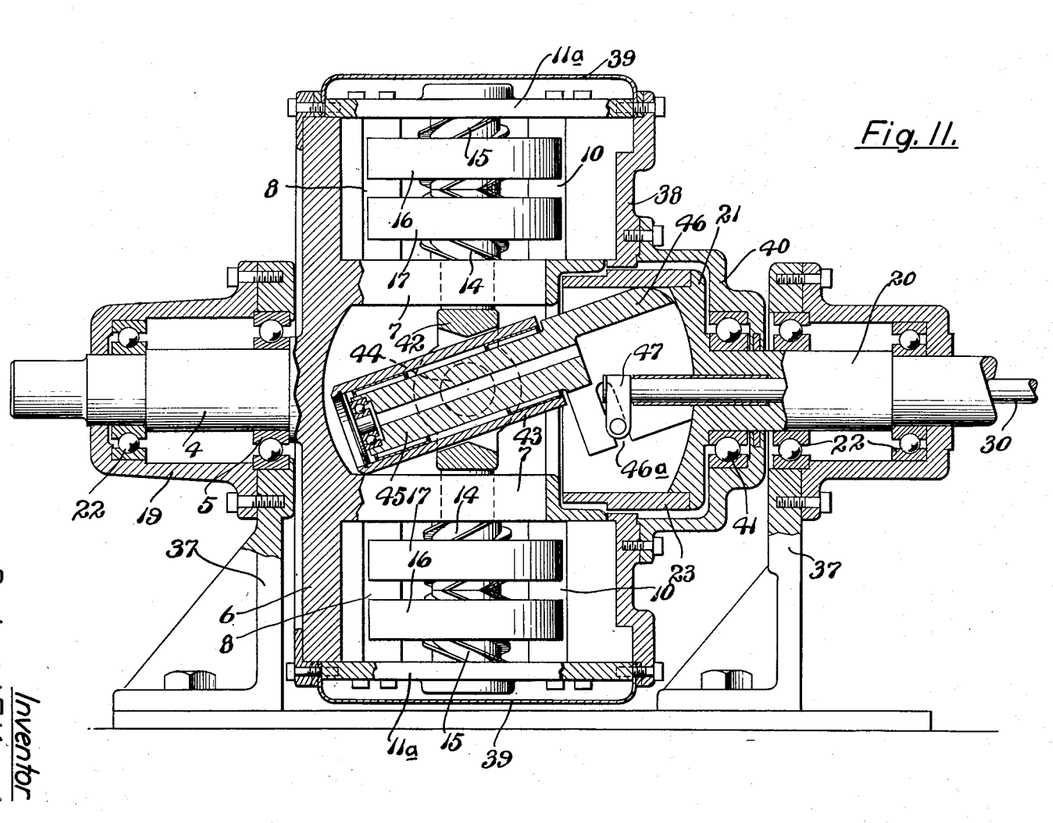
Fig. 11 is a view similar to Fig. 1 showing another form or embodiment of the invention.

In the structure shown in Fig. 11, spaced supporting standards 37 carry housings 19 at their upper ends, in one of which the driving shaft 4 is rotatably mounted on spaced bearings 5 and 22, and in the other of which the driven shaft 20 is rotatably mounted on the bearings 22 as shown. The housing with such construction is connected directly with the shaft 4, the plate 6 providing one end of the housing, an end plate 38 attached by screws or the like, the other end thereof, and a sheet metal generally cylindrical wall extending between the peripheral portions of the parts 6 and 38 to complete the housing. The guides 10 for the weights 16 and 17 are formed as a part of the end closure 38. The cross bars 11a serve the same function as the bars 11 in the first described structure, extending between the guides 8 and 10 and being attached thereto as shown. The end plate 38 is connected to the open end of an additional housing 40 through which the driven shaft 20 extends through an anti-friction bearing 41 for the shaft carried by the housing 40.

Instead of the universal joint block and studs 36, the adjacent ends of the shafts 12 are connected by a center block 42 which has an opening therein of the smallest diameter between its sides, progressively increasing in diameter from the smallest diameter to the opposite sides of the block 42. An elongated sleeve 43 passes through the block 42 and is mounted on opposite trunnions, indicated in dashed lines at 44 in Figure 11, which are carried by the opposed sides of the block 42 at each side of the opening therethrough. The arm 45 corresponding to the previously described shaft 31 is located lengthwise of and within the sleeve 43 and mounted for rotation therein. It has a head 46 equivalent to and serving substantially the same function as the block 27 located between the opposed sides of the head 21 on the shaft 20. The adjustment of the head 46 and its connected shaft 45 from an angular position as in Fig. 11 to the position in which the shaft 45 is in alignment with the shafts 4 and 20, is by means of a yoke 47 connected to the inner end of the rod 30, the yoke having a cross pin passing through a slot 46a in the head 46, longitudinal movement of the shaft 30 effecting such adjustment, the same as rotation of the pinion 28 changes the angular position of the head 27 in the previously described structure.

The operation is not appreciably different from that shown in the prior described structure. Change with respect to the torque arm comprises a reversal of it, while the adjustment to different angular positions is by a different specific structure but one which is equivalent to the rack 28 and the gear 29. The springs 18 are not used but may be used if wanted. They would be used if in the mechanism with which the apparatus was used it was desirable to drive the shaft 4 by the shaft 20. The rotating housing may carry lubricant therewithin, though preferably, lubrication will be through fog or mist and not by liquid.

Figure 12:
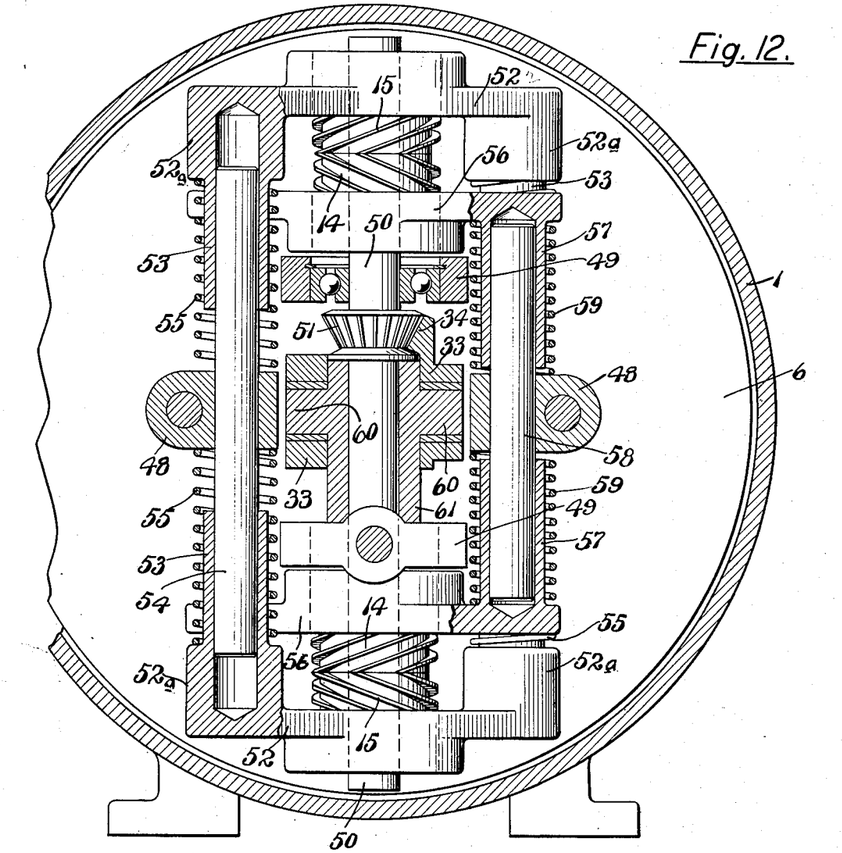
Fig. 12 is a transverse vertical section similar to the section shown in Fig. 6 of a still further form of embodiment of my invention.

In the structure shown in Fig. 12, diametrically opposed supports 48 are connected to the plates 6, as are also bearings 49 at opposite sides of the center of the apparatus and located at right angles to the supports 48. A shaft 50 extends through the bearings 49 and through the center of the apparatus, on which is a beveled pinion 51, located as shown. The shaft 50 at each end is rotatably mounted in a member 52. Each of the members 52 has bosses 52a thereon, the bosses on one member extending toward those on the other. Each of the said bosses 52a has a sleeve extension 53. A rod 54 passes through each of the supports 48, at its end portions having a slidable fit within the sleeves 53. A coiled compression spring 55 is around the sleeves 53, at one end bearing against a boss 52a and at the other against a support 48. There are eight of such springs which, under compression tend to move the members 52 outward. The worms 15 on the shaft 50 thread through interiorly formed worm teeth, one at the middle portion of each of the members 52 so that the inward and outward movement of the members 52 is controlled by the rotating movement of the worms 15.

Two additional members 56, similar to the members 52, are threadedly engaged with the inner worms 14. Each at each end has a sleeve 57, which sleeves extend toward each other, and each pair of opposite sleeves has the end portions of the rods 58 extending thereinto, the central portion of the rods 58 passing through the supports 48. Similarly, around each sleeve 57 is a coiled compression spring 59 bearing at one end against a support 48 and at the other end against the member 56.

A center block 60 has two opposed trunnions with which the sides 33 of the fork connected with the arm 31 have rotatable engagement, and the gear segment 34 on one of said sides 33 is in meshing engagement with the pinion 51. The center block has an extension 61 extending to and bearing against one of the brackets 49, the shaft 15 passing through the block as shown.

With this construction, the shaft 50 is rocked back and forth when the driven shaft 4 which drives the plate 6 is rotated and the shaft 31 is out of alignment therewith, thereby simultaneously actuating the worms 14 and 15 to move the weighted members 52 and 56 simultaneously toward or away from each other. The springs perform the same function as the springs 18 when used with a mechanism driven thereby, for example an automobile or other transmission, or in a case where the driven shaft 20 directly connects through a differential gearing with the automobile rear axle. The springs have a greater force than load resistance on the crankshaft of an engine when such crankshaft is to be driven, from the shaft 20, the shaft 20 in turn being driven by the rear axle when the motor vehicle is pushed by another as in starting. With the structure as described if the driving force on the shaft 4 is not sufficient to turn the shaft 20 and the load applied thereto in direct drive, the weights 56 and 52 balance and compensate without stalling, though if such structure and operative means for using it was not used stalling would occur. Accordingly, with the transmission structure which I have invented there is a prevention of such stalling, and a driving of the shaft 20 at a lower speed of rotation than the shaft 4, which will progressively increase, for example after the inertia and other resistance to rotation of the shaft 20 has been overcome, until there is a balancing of force input with force output and eventually, if the force input from the shaft 4 is heavy enough, there is a direct one to one driving ratio between the driving shaft 4 and the driven shaft 20. All ratios in between from a standing start to the eventual one to one direct drive may be passed through. In those cases where the load on the driven shaft 20 increases, there is an automatic change of the ratio of drive of the shafts 4 and 20, the shaft 20 being driven at a lower speed than the drive shaft 4. This is true of all forms of structure which have been shown.

The structure described has been built and operated and tested and serves the purposes for which it was designed in a fully satisfactory manner.

The invention is defined in the appended claims and is to be considered comprehensive of all forms of structure coming within their scope.

I claim:

1. In a mechanism having aligned driving and driven shafts, a torque arm connected with the driving shaft for universal angular movement relative thereto, adjustable cooperating means relatively connecting said torque arm to one end of the driven shaft, said torque arm being adjustable from a position in alignment with the driving and driven shafts, to an indefinite number of positions at angles to the axis of the driving and driven shaft, the improvement comprising, a rotatably mounted shaft located at right angles to the driving shaft, connections between the torque arm and said right angularly disposed shaft for rocking said last mentioned shaft about its longitudinal axis in alternately opposite directions when the torque arm is at an angle to the driving shaft, and members geared on said right angularly located shaft movable toward and away from each other as said shaft is rocked in opposite directions.

2. A structure as in claim 1, and springs between said members yieldingly resisting the movement thereof toward each other.

3. In a mechanism having aligned driving and driven shafts, a torque arm connected to the driving shaft or universal angular movement relative thereto, adjustable cooperating means connecting said torque arm to one end of the driven shaft, said torque arm being adjustable from a position in alignment with the driving and driven shafts to an indefinite number of positions at angles thereto, the improvement comprising a shaft mounted for rotation and located at right angles to the axis of the driving and driven shafts, connections between the torque arm and said right angularly located shaft for rocking it about its longitudinal axis when the torque arm is out of alignment with the driving and driven shafts, members secured against rotation on said right angularly located shaft, opposite worms on said last mentioned shaft and worm gearing on said members, engaging, one with each worm, for alternately moving said members toward and away from each other.

4. In a mechanism having axially aligned rotatable driving and driven shafts, a torque arm between said shafts, means connecting the torque arm with said shafts for adjustment of one end of the torque arm away from or toward the axis of the driven shaft and for universal angular movement relative to the driving shaft, the improvement comprising, two aligned worm shafts located at right angles to the axis of the driving and driven shafts, gearing connections between the torque arm and said last mentioned aligned shafts, a member through which each worm shaft passes, each interiorly threaded to correspond to its associated worm, and means holding said members from rotation, said members being alternately moved toward and away from each other on operation of the driving shaft.

5. A structure as defined in claim 4, said worm shafts and cooperating threads on said members being of the locking type, securing said members against movement longitudinally of their respective shafts except on turning of said shafts.

6. A structure as defined in claim 4, and spring means between the members on each shaft yieldingly resisting movement thereof toward each other.

7. In a mechanism having aligned driving and driven shafts and a torque arm, having two aligned parts rotatable with respect to each other about the longitudinal axis of said arm, said arm being located between said shafts and connected with the driving shaft to turn therewith and with the driven shaft for outward and inward adjustment to position said arm in alignment with said shafts or in a plurality of inclined positions relative thereto, the improvement comprising diametrically opposed pairs of weights spaced from the axis of said shafts, and means carrying said weights connected with the torque arm, for operation by the arm, when said arm is out of alignment with said shafts and said arm is driven by the drive shaft, for alternately moving said weights of each pair of weights away from and toward each other until the driven shaft is driven at the same speed of rotation as the drive shaft.

8. In a mechanism having aligned driving and driven shafts, and a torque arm of two parts, one part connected at one end by a universal joint connection with the driving shaft to turn therewith and telescoping slidably and rotatively into the other part, said other part having an adjustable connection with the driven shaft for movement toward and away from a position in which the torque arm aligns with said shafts, the improvement comprising, two aligned shafts having a common axis at right angles to the first mentioned shafts operatively connected with the first mentioned part of the torque arm to rock back and forth about their axis when the drive shaft is rotated and the arm is out of alignment with the drive and driven shafts, members through which each of said last mentioned shafts pass, and gearing connections between said members and their respective shafts for simultaneously moving said members away from and toward each other when said shafts are rocked.

9. A structure as in claim 8 and yielding means acting on the members on each of said last mentioned shafts resisting movement of said members toward each other.

10. In a mechanism having aligned driving and driven shafts, and a torque arm of two parts, one part connected at one end by a universal joint connection with the driving shaft to turn therewith, and having a telescoping slidable and rotative connection with the other part, said other part having an adjustable connection with the driven shaft for movement toward and away from a position in which the torque arm aligns with said shafts, the improvement comprising, members located outwardly from said universal joint connection at opposite sides thereof, means on which said members are mounted for inward and outward radial movement, and connections between said last mentioned means and the torque arm for alternately moving said members inward and outward during each rotation of the drive shaft, when said arm is out of alignment with said drive and driven shafts, and the resistance to rotation of the driven shaft retards speed of rotation thereof to less than that of the drive shaft.

11. In a mechanism having aligned driving and driven shafts, and torque arm of two parts, one part connected at one end by a universal joint connection with the driving shaft to turn therewith, and having a telescoping slidable and rotative connection with the other part, said other part having an adjustable connection with the driven shaft, whereby the said shafts and torque arm may be located in alignment, or the torque arm located in a plurality of positions at acute angles to the rotative axis of said shafts, the improvement comprising, two pairs of weighted members located outwardly from said universal joint connection, one pair at one side and the other pair at the other side thereof, means on which said members are mounted for inward and outward movement, and connections between the torque arm and said last mentioned means for alternately moving two of said members inwardly and the other two outwardly radially when said arm is out of alignment with said drive and driven shafts, and the driven shaft has a load thereon causing resistance to its rotation at a speed equal to that of the drive shaft.

12. In a mechanism having aligned driving and driven shafts, spaced at adjacent ends, and a torque arm of two parts, one part adjustably connected to the driven shaft for movement thereof about an axis transverse of the axis of said shafts through an arc centered in said transverse axis, the other part of the torque arm having slidable and rotative connection to the first part thereof, the improvement comprising, a head connected with the drive shaft, supports thereon paralleling the axis of said shafts, radially disposed, aligned shafts rotatively mounted on and passing through the supports, the axes of the drive and driven shafts, the transverse axis and the axis of the radial shafts crossing at a common point, gears connected one to each of said radial shafts at the inner ends thereof, said other part of the torque arm having a fork with spaced sides rockingly connected to rock about said transverse axis, gear segments on said fork sides meshing with said gears, two oppositely threaded worms on each of the radial shafts, and members movably mounted for inward and outward movement on said support through which the worms pass.

13. In a mechanism having axially aligned drive and driven shafts, spaced at adjacent ends, and a torque arm having two parts slidably and rotatably connected relative to each other, one part having an adjustable slidable connection with the driven shaft for arcuate adjustment of the arm about a transverse axis crossing the longitudinal axis of rotation of said shafts between the adjacent ends thereof, the improvement comprising a plate connected to the end of the drive shaft nearest the driven shaft, spaced supports at diametrically opposite sides of and parallel to the longitudinal axis of said shafts connected with and extending from said plate, a transverse shaft rockingly mounted on said supports the axis of turning of which is at right angles to both said transverse axis and the longitudinal axis of said shafts, all of said axes intersecting at a common point, oppositely threaded worms on said transverse shaft, two at each end portion thereof, members, four in number, through each of which a worm passes, one for each member, spring means engaging each of said members, yieldingly resisting inward movements thereof, a gear on said transverse shaft, and a gear segment on the other part of the torque arm in meshing engagement with said gear.

14. In a mechanism having aligned drive and driven shafts, spaced at adjacent ends, a torque arm having two parts longitudinally slidable and rotatably connected relative to each other, one part adjustably connected with the driven shaft for inward and outward arcuate adjustment about a center at the outer end of the other part of said torque arm, and means connecting said other part of the torque arm to said drive shaft, the improvement comprising centrifugal weighted members at diametrically opposite sides of and spaced from the axis of the drive and driven shafts, rotative means connected with the drive shaft carrying said members for moving said members inwardly and outwardly on turning of said rotative means in opposite directions, and means operatively connecting said other part of the torque arm with said rotative means for actuating said rotative means in opposite directions during unequal speeds of rotation of the drive and driven shafts upon operation of the drive shaft, with the torque arm misaligned with said drive and driven shaft, said means for actuating said rotative means becoming inoperative upon the driven shaft attaining the same rotative speed as the drive shaft.

BERTRAND F. KENYON.

References Cited in the file of this patent

UNITED STATES PATENTS

| Number | Name | Date |
|---|---|---|
| 1,760,850 | Remington | May 27, 1930 |
| 2,149,560 | Teece et al. | Mar. 7, 1939 |
| 2,309,172 | Dekanski | Jan. 26, 1943 |
| 2,554,334 | Kenyon | May 22, 1951 |

FOREIGN PATENTS

| Number | Country | Date |
|---|---|---|
| 45,061 | France | May 29, 1935 |
| | (Addition to No. 774,746) | |
| 591,044 | France | Apr. 1, 1925 |